(12) United States Patent
Chuan

(10) Patent No.: US 7,422,230 B2
(45) Date of Patent: Sep. 9, 2008

(54) ONE HAND FOLDING STRUCTURE FOR STROLLER

(75) Inventor: Chang Ling Chuan, Chia Tai Industrial Tai Pao (TW)

(73) Assignee: Link Treasure Limited, Tortola (BV)

( * ) Notice: Subject to any disclaimer, the term of this patent is extended or adjusted under 35 U.S.C. 154(b) by 568 days.

(21) Appl. No.: 11/161,736

(22) Filed: Aug. 15, 2005

(65) Prior Publication Data

US 2006/0043699 A1    Mar. 2, 2006

(30) Foreign Application Priority Data

Aug. 27, 2004   (TW) ............................... 93213681 U

(51) Int. Cl.
*B62B 7/08* (2006.01)
(52) U.S. Cl. .................. 280/642; 280/643; 280/647; 280/648; 280/658
(58) Field of Classification Search ................. 280/642, 280/643, 644, 647, 648, 650, 654, 657, 658
See application file for complete search history.

(56) References Cited

U.S. PATENT DOCUMENTS

| | | | | |
|---|---|---|---|---|
| 6,068,284 A | | 5/2000 | Kakuda | ...................... 280/642 |
| 6,155,740 A | * | 12/2000 | Hartenstine | .................. 403/102 |
| 6,827,365 B2 | * | 12/2004 | Yeh | ............................ 280/642 |
| 6,877,760 B2 | * | 4/2005 | Wang | ......................... 280/642 |
| 6,910,708 B2 | * | 6/2005 | Sack et al. | .................. 280/642 |
| 6,921,102 B2 | * | 7/2005 | Hsia | ........................... 280/642 |
| 7,021,650 B2 | * | 4/2006 | Chen | .......................... 280/642 |
| 2005/0098981 A1 | * | 5/2005 | Chang | ........................ 280/642 |

* cited by examiner

*Primary Examiner*—Christopher Ellis
*Assistant Examiner*—John D Walters
(74) *Attorney, Agent, or Firm*—Alan Kamrath; Kamrath & Associates PA

(57) ABSTRACT

A one hand folding structure for stroller, where a driving member is a able to drive engaging rods provided at opposing sides to disengage from engaging portions simultaneously, so as to allow one hand folding operation, wherein the driving member is provided beneath the stroller seat, so that in folding the frame the user would naturally removes the toddler from the seat first and then activates the driving member of driving device to result in a series of one hand folding responses, so as to prevent accidental folding and possible dangers while the user pushes the stroller while allowing one hand operation to achieve the intended folding operation.

9 Claims, 5 Drawing Sheets

ONE HAND FOLDING STRUCTURE FOR STROLLER

CROSS-REFERENCES TO RELATED APPLICATIONS

Not Applicable

STATEMENT REGARDING FEDERALLY SPONSORED RESEARCH OR DEVELOPMENT

Not Applicable

DESCRIPTION

1. Field of Invention

This invention relates to a one hand folding structure used for folding any type of strollers where only one hand operation is needed to fold the strollers, and a driving member is provided beneath a seat to eliminate accidental activation.

2. Background

Conventional strollers can usually be extended into an extended position for use and for riding babies or folded into a collapsed position for storage. When one intends to fold the strollers from its extended state to collapsed state, the folding structure can only be operated after the toddler riding in the frame has been taken away. However, if the toddler has yet to learn walking or standing alone, the user usually needs to hold the toddler in one hand with the remaining hand to operate the folding structure, which is relatively inconvenient. Therefore, strollers having a one hand operation folding structure have been commercially available to allow the user to control and release the frame for folding the frame of the stroller into the collapsed state.

In the conventional structure, such as that disclosed in U.S. Pat. No. 6,068,284, the stroller includes a frame and a wheel assembly for supporting and moving the frame. The frame mainly includes handle tubes, front leg tubes, rear leg tubes, seat tubes, a joint release mechanism and a folding controller, wherein the handle tubes include grip portions and two handle lower tubes and the joint release mechanism at least include an engaging rod and a recovering spring.

The folding controller of the conventional structure is provided to the gripping portions of the handle tubes, where the folding controller drives the engaging rod in the joint release mechanism to release and engage by means of a flexible member therein, for extending and collapsing the stroller.

In the above frame, the conventional folding controllers are provided to the gripping portions of the handle tubes, which are mainly used to push the stroller while the stroller is in use. Accordingly, the user can possibly accidentally activate the folding controller thereby resulting in accidental folding when the two features are provided at the same location, which may expose the toddler riding in the stroller to dangers. However, the addition of an independent folding controller will result in increased cost.

SUMMARY OF INVENTION

To overcome the shortcoming the of conventional folding controlling devices that are provided to the gripping portion of the handle tube, which can possibly result in accidental activation of the folding controller while pushing the stroller, this invention discloses a driving member provided beneath the seat, wherein the driving member has opposing ends connected to respective rotating members provided to opposing sides of the frame. The frame is collapsed after the toddler leaves the seat by activating the driving member so as to prevent accidental folding and possible dangers due to erroneous operation of the user.

BRIEF DESCRIPTION OF THE DRAWINGS

These and other modifications and advantages will become even more apparent from the following detained description of a preferred embodiment of the invention and from the drawings in which.

DETAILED DESCRIPTION OF THE INVENTION (PREFERRED EMBODIMENTS)

Figure 1:
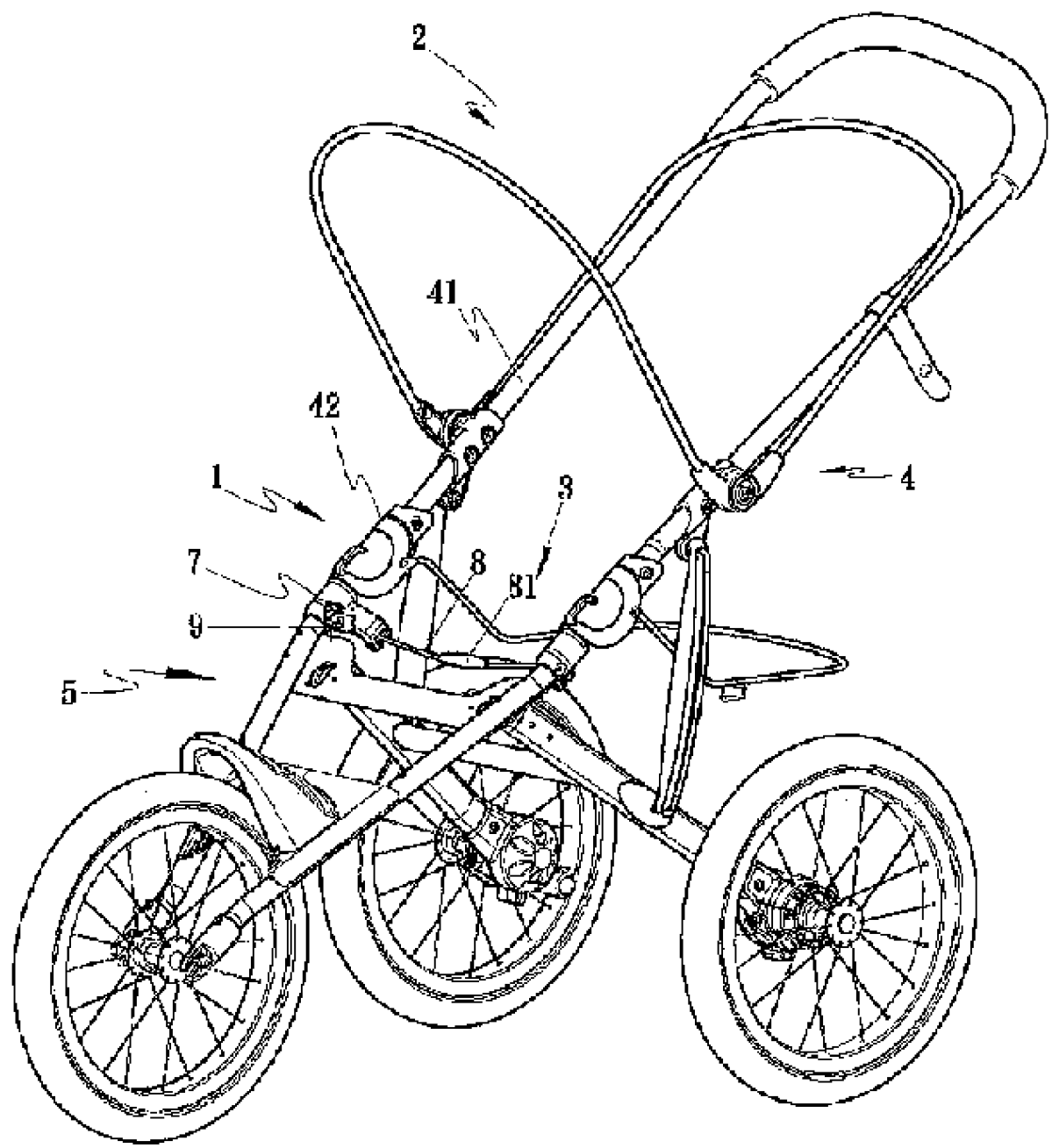
FIG. 1 is a perspective view of this invention
Figure 2:
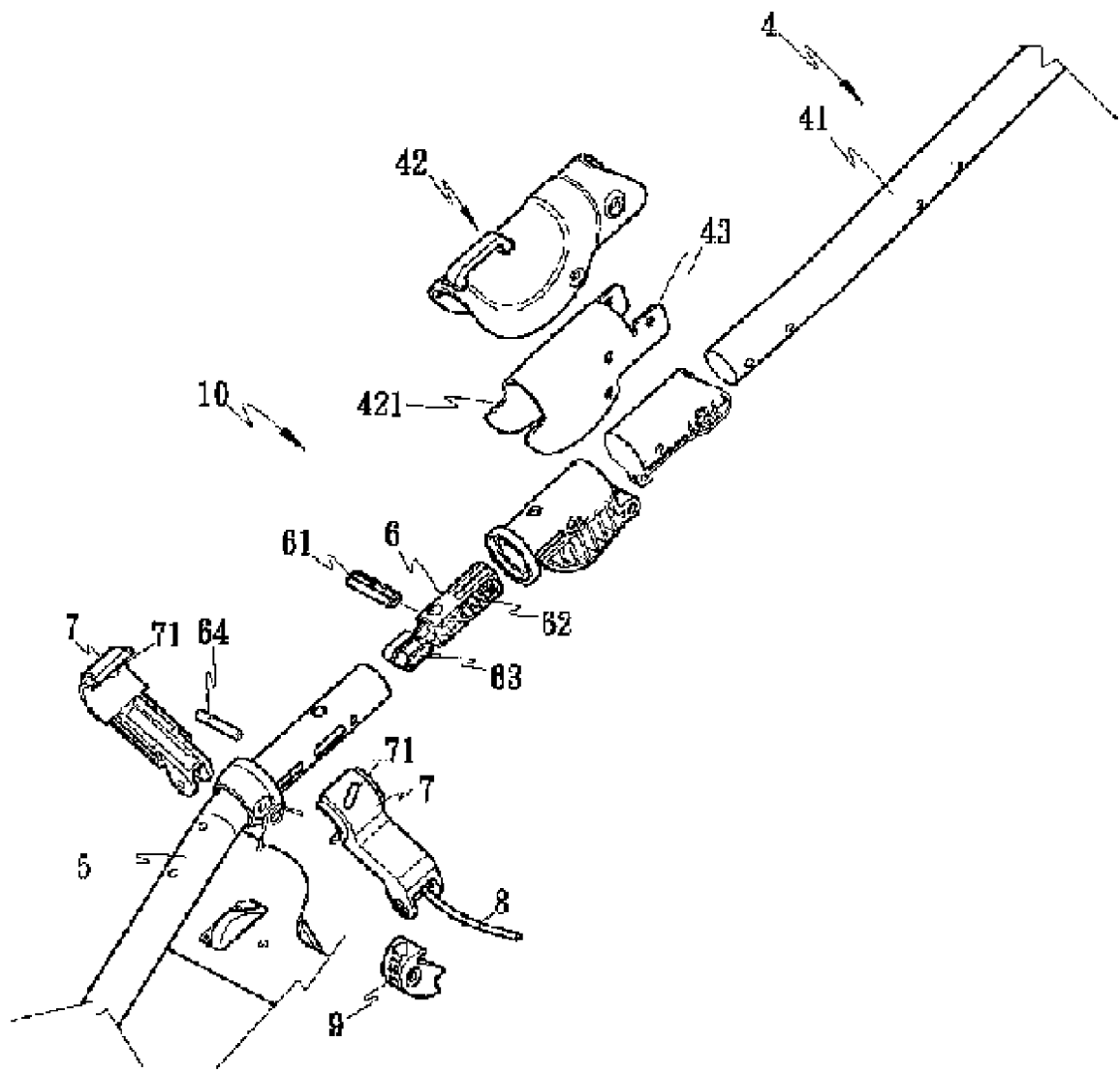
FIG. 2 is an exploded view of this invention.
Figure 3:
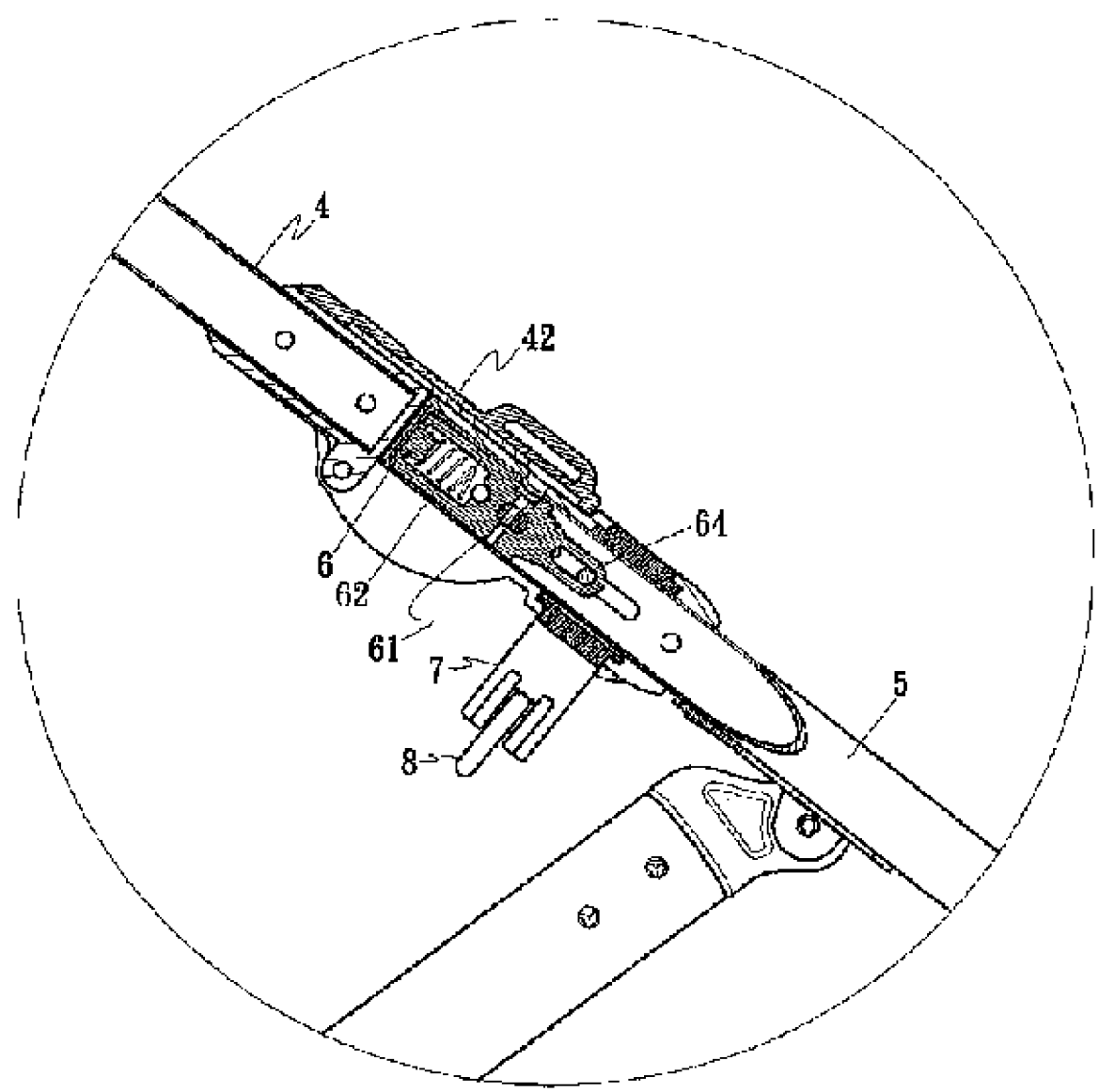
FIG. 3 is a cross-sectional view of this invention.
Figure 4:
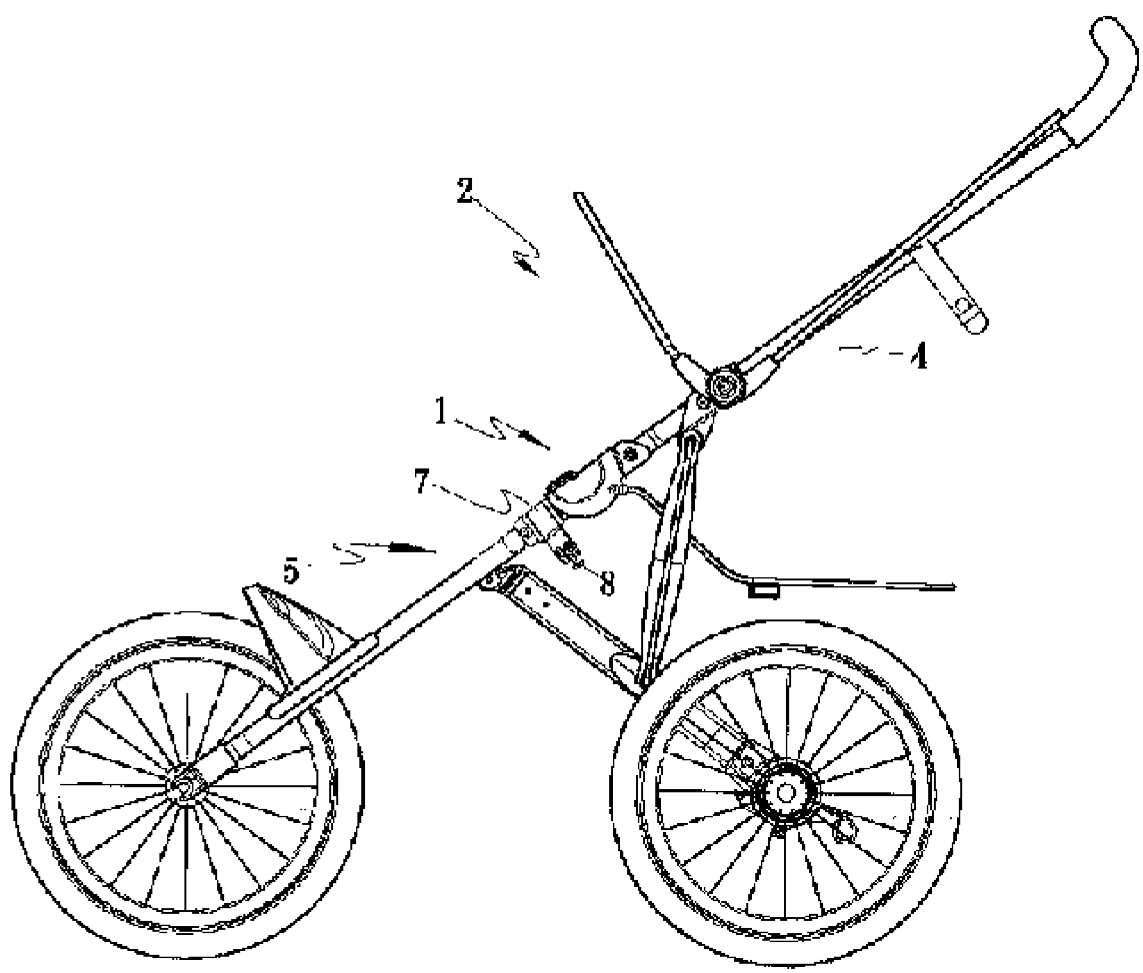
FIG. 4 is a side elevational view of this invention.

With reference to FIGS. 1-4, this invention discloses a one hand folding structure for stroller 1 provided to a foldable stroller frame 2 and to be activated by a user at a location beneath a seat 3 for folding the stroller frame 2, so as to prevent the user from accidental activation of undesired folding that would expose a toddler to dangers. This invention includes an upper frame 4, a lower frame 5, a slide member 6, rotating member 7 and a driving member 8

The upper frame 4 includes a pushing rod 41, where the pushing rod 41 serves to be pushed by the user. The upper frame 4 is provided at opposing lower ends thereof with an upper joint 42 that is affixed thereto. The upper joint 42 includes an engaging portion 421. In this embodiment, the upper joint 42 is provided with a reinforced member 43 to reinforce the upper joint 42.

The lower frame 5 includes an upper end pivoted to the upper joint 42 of the upper frame 4 to cause the lower frame 5 rotating towards a single direction approaching the upper frame 4 for folding.

The slide member 6 is provided in opposing sides of the lower frame 5 and capable of vertically reciprocal movement in the lower frame 5. The slide member 6 further includes an engaging rod 61 laterally projecting out of the lower frame 5 and moving along with the slide member 6. The engaging rod 61 is maintained to form an engagement with the engaging portion 421 of the upper joint 42 by means of a resilient member 62, so as prevent the upper frame 4 from rotating in a folding direction. The slide member 6 is further formed at a lower end thereof with a slot opening 63 through and to which a driving rod 64 passes and is connected.

The rotating member 7 is rotatably provided to opposing upper ends of the lower frame 5. In this embodiment, the rotating member 7 includes a pair of lids. The rotating member 7 is formed with a driving slot 71 in which the driving rod 64 moves. Since the driving rod 64 passes through the slide member 6, when the rotating member 7 rotates, the driving slot 71 would drive vertically reciprocal movement of the slide member 6.

Figure 5:
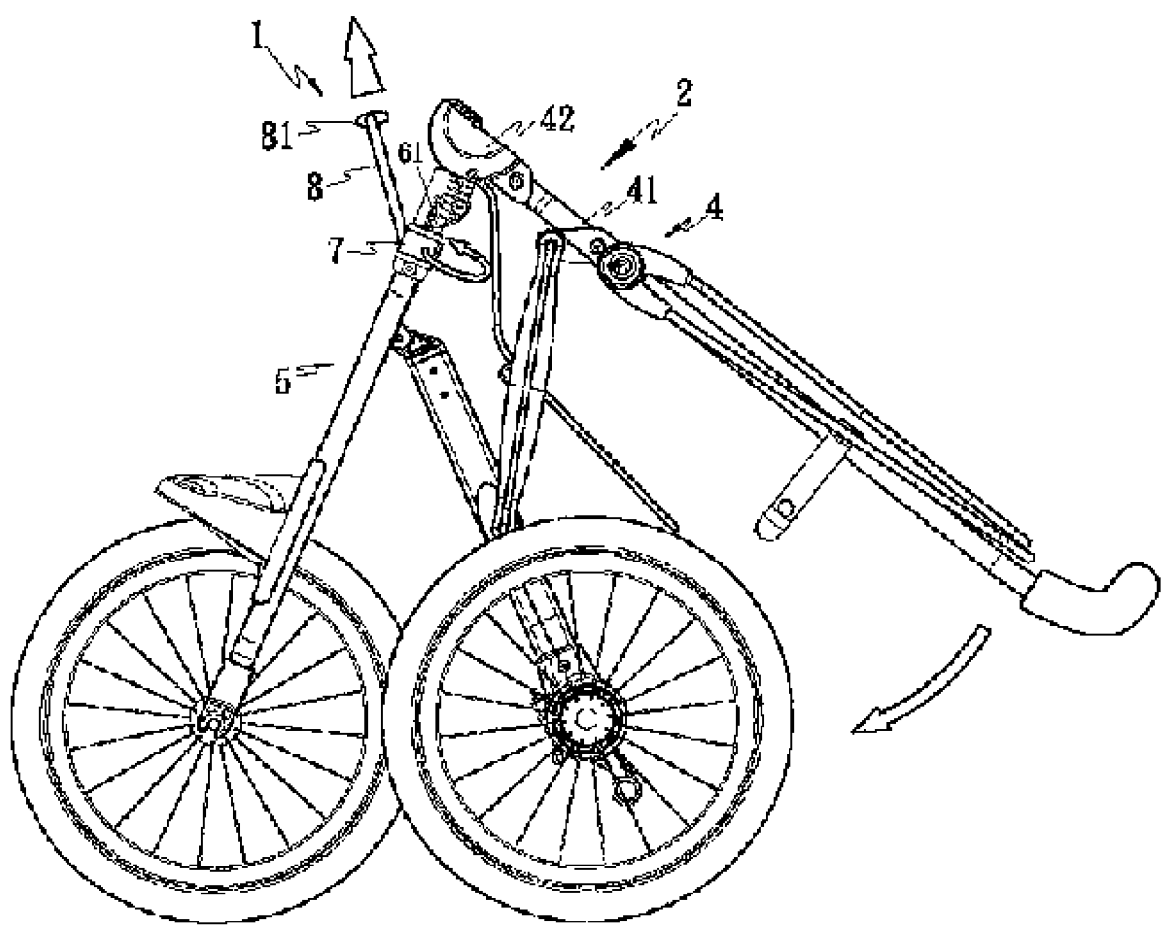
FIG. 5 is a schematic view showing this invention while folding the frame.

In this embodiment, the driving member 8 is a flexible cable and a grip 81 is provided at a medial section of the driving member 8 with a grip 81 to be gripped by the user. The driving member 8 includes opposing ends that are each connected to the rotating member 7. The user is able to activate the driving member 8, so that the driving member 8 would cause simultaneous rotation of the rotating member 7 at opposing sides thereof so as to release engagement between the engaging rod 61 and the engaging portion 421 of the upper joint 42, whereby the user is able to activate the entire stroller frame 2 for folding the stroller frame 2 (as shown in FIG. 5).

To enhance safeness of this invention, the lower frame 5 may further be provided with a safety piece 9 at a location corresponding to rotation of the rotating member 7, so that when the stroller frame 2 is at its extended state, the safety piece 9 is able to prevent the rotating member 7 from being activated by the driving member 8 to release the stroller frame 2. When the user intends to fold the frame, the safety piece 9 is first rotated to release restriction to the rotating member 7, so that the user is able to activate the driving member 8 for folding the frame 2, thereby enhancing safeness of this invention.

According to the one hand folding structure for stroller of this invention, the one hand operation is achieved by a driving member provided to a lower portion of the stroller frame seat. This invention may also be further provided with a safety piece so as to further enhance the safeness in folding the stroller frame of this invention.

This invention is related to a novel creation that makes a breakthrough in the art. Aforementioned explanations, however, are directed to the description of preferred embodiments according to this invention. Since this invention is not limited to the specific details described in connection with the preferred embodiments, changes and implementations to certain features of the preferred embodiments without altering the overall basic function of the invention are contemplated within the scope of the appended claims.

What is claimed is:

1. A one hand folding structure for a stroller, mounted to a foldable frame, comprising:
    an upper frame, connected to an upper joint, the upper joint being provided with an engaging portion at a lower end thereof;
    a lower frame, pivoted to the upper frame to form a one-way folding relationship;
    a slide member, movable in the lower frame, the slide member including an engaging rod capable of moving along with the slide member, so that the one-way folding between the upper frame and the lower frame is prevented when the engaging rod moves to an upper position to urge against an engaging portion of the upper joint, and the one-way folding between the upper frame and the lower frame is permitted when the engaging rod moves to a lower position to disengage from the engaging portion;
    a rotating member, rotatably provided to the lower frame, the rotating member including a driving slot, the driving slot serving to drive vertical or reciprocal movement of the slide member so as to control the engaging rod to be engaged or disengaged from the engaging portion; and
    a driving member, having opposing ends that are each connected to the rotating member for causing simultaneous rotation of the rotating member rotatably provided to opposing upper ends of the lower frame for folding the frame.

2. The one hand folding structure for stroller of claim 1, wherein the engaging rod passes through the lower frame and laterally projects out of the lower frame.

3. The one hand folding structure for stroller of claim 1, wherein the slide member is further formed at a lower end thereof with a slot opening.

4. The one hand folding structure for stroller of claim 3, wherein the slot opening serves to allow a driving rod to pass through, where the driving rod drives reciprocal movement of the slide member.

5. The one hand folding structure for stroller of claim 1, wherein the slide member and lower frame are provided therebetween with resilient member, whereby resilience of the resilient member serves to maintain engagement between the engaging rod and the engaging portion of the upper joint.

6. The one hand folding structure for stroller of claim 1, wherein the driving member is a flexible cable.

7. The one hand folding structure for stroller of claim 1, wherein the driving member is provided at a medial section thereof with a grip.

8. A one hand folding structure for stroller, mounted to a foldable frame, comprising:
    an upper frame, connected to an upper joint, the upper joint being provided with an engaging portion at a lower end thereof;
    a lower frame, pivoted to the upper frame to form a one-way folding relationship;
    a slide member, movable in the lower frame, the slide member including an engaging rod capable of moving along with the slide member, so that the one-way folding between the upper frame and the lower frame is prevented when the engaging rod moves to an upper position to urge against an engaging portion of the upper joint, and the one-way folding between the upper frame and the lower frame is permitted when the engaging rod moves to a lower position to disengage from the engaging portion;
    a rotating member, rotatably provided to the lower frame, the rotating member including a driving slot, the driving slot serving to drive vertical or reciprocal movement of the slide member so as to control the engaging rod to be engaged or disengaged from the engaging portion;
    a driving member, having opposing ends that are each connected to the rotating member, so that a user is able to activate the driving member for causing rotation of the rotating member at opposing sides of the lower frame for folding the frame; and
    a safety piece, pivoted to the lower frame, the safety piece preventing the rotating member form being activated by the driving member when the foldable frame is at an extended state.

9. The one hand folding structure for stroller of claim 8, wherein the safety piece is rotatably pivoted to the lower frame.

* * * * *